United States Patent
Sukegawa et al.

(10) Patent No.: US 10,458,347 B2
(45) Date of Patent: Oct. 29, 2019

(54) POWER TRAIN SYSTEM

(71) Applicant: Hitachi, Ltd., Chiyoda-ku, Tokyo (JP)

(72) Inventors: Yoshihiro Sukegawa, Tokyo (JP); Masato Kaneeda, Tokyo (JP); Shigeo Hatamiya, Tokyo (JP)

(73) Assignee: HITACHI, LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/746,648

(22) PCT Filed: Jul. 27, 2015

(86) PCT No.: PCT/JP2015/071214
§ 371 (c)(1),
(2) Date: Jan. 22, 2018

(87) PCT Pub. No.: WO2017/017754
PCT Pub. Date: Feb. 2, 2017

(65) Prior Publication Data
US 2018/0209361 A1    Jul. 26, 2018

(51) Int. Cl.
*F02D 41/00* (2006.01)
*F02M 26/35* (2016.01)
(Continued)

(52) U.S. Cl.
CPC ....... *F02D 41/0052* (2013.01); *F02D 41/005* (2013.01); *F02M 26/35* (2016.02);
(Continued)

(58) Field of Classification Search
CPC combination set(s) only.
See application file for complete search history.

(56) References Cited

U.S. PATENT DOCUMENTS 5,636,619 A * 6/1997 Poola ................ B01D 53/22
                                                  123/585
5,943,859 A * 8/1999 Kawamura ............ C01B 3/38
                                                  252/373
(Continued)

FOREIGN PATENT DOCUMENTS

JP    H10-047095 A    2/1998
JP    2001-355471 A   12/2001
(Continued)

OTHER PUBLICATIONS

International Search Report with English translation and Written Opinion issued in corresponding application No. PCT/JP2015/071214 dated Oct. 6, 2015.

*Primary Examiner* — Binh Q Tran
(74) *Attorney, Agent, or Firm* — Foley & Lardner LLP (57) ABSTRACT

To provide a novel power train system capable of improving fuel efficiency, reducing harmful components of an exhaust gas, and improving an output by adjusting a composition of a gas component of the exhaust gas in accordance with an operation condition. Therefore, provided is a power train system including a gas component separation unit (2) which extracts a plurality of gas components having different specific heat ratios from an exhaust gas of a spark ignition type internal combustion engine (1), a recirculation unit which recirculates the plurality of gas components to a combustion chamber of the internal combustion engine, and a ratio adjustment unit (3) which adjusts a ratio of the plurality of gas components recirculated to the combustion chamber in response to an operation state of the internal combustion engine. A composition of a gas recirculated to the internal combustion engine can be adjusted depending on various operation conditions. Accordingly, it is possible to improve fuel efficiency, reduce harmful components of an (Continued)

exhaust gas, and improve an output in a wide range of operation conditions of the internal combustion engine.

13 Claims, 9 Drawing Sheets

(51) Int. Cl.
*F02M 26/36* (2016.01)
*F02M 26/45* (2016.01)
*F02M 26/00* (2016.01)

(52) U.S. Cl.
CPC ....... *F02M 26/36* (2016.02); *F02D 2200/021* (2013.01); *F02D 2200/0414* (2013.01); *F02D 2200/0418* (2013.01); *F02D 2200/0606* (2013.01); *F02D 2200/0611* (2013.01); *F02D 2200/0614* (2013.01); *F02D 2200/101* (2013.01); *F02D 2200/1002* (2013.01); *F02M 26/45* (2016.02); *F02M 2026/009* (2016.02); *Y02T 10/47* (2013.01)

(56) References Cited

U.S. PATENT DOCUMENTS

| | | | | |
|---|---|---|---|---|
| 6,067,973 | A * | 5/2000 | Chanda | F02B 75/02 |
| | | | | 123/585 |
| 6,079,373 | A * | 6/2000 | Kawamura | F01N 3/0857 |
| | | | | 123/3 |
| 10,054,022 | B2 * | 8/2018 | Bradford | F01N 3/005 |
| 10,132,275 | B2 * | 11/2018 | Kikuchi | F02M 26/06 |
| 10,197,019 | B2 * | 2/2019 | Shimada | F02D 41/02 |
| 2010/0229841 | A1 * | 9/2010 | Nakayama | F02M 26/15 |
| | | | | 123/568.11 |
| 2012/0298073 | A1 | 11/2012 | Murata | |

FOREIGN PATENT DOCUMENTS

| | | |
|---|---|---|
| JP | 2008-051016 A | 3/2008 |
| JP | 2010-190134 A | 9/2010 |
| JP | 2010-255500 A | 11/2010 |
| JP | 2011-012653 A | 1/2011 |
| JP | 2011-231635 A | 11/2011 |
| JP | 2012-246781 A | 12/2012 |
| JP | 2015-078640 A | 4/2015 |
| JP | 2015-129489 A | 7/2015 |

* cited by examiner

$CO_2/N_2$ RATIO SETTING EXAMPLE (UNIFORM ROTATION SPEED)

CO₂/N₂ RATIO SETTING EXAMPLE (UNIFORM ROTATION SPEED)

FIG. 11

CO₂/N₂ RATIO SETTING EXAMPLE (UNIFORM ROTATION SPEED)

FIG. 12

CO₂/N₂ RATIO SETTING EXAMPLE (UNIFORM TORQUE)

$CO_2/N_2$ RATIO SETTING EXAMPLE (UNIFORM ROTATION SPEED AND TORQUE)

ALCOHOL CONCENTRATION

FIG. 17

$CO_2/N_2$ RATIO SETTING EXAMPLE (UNIFORM ROTATION SPEED AND TORQUE)

NATURAL GAS CONCENTRATION

FIG. 18

$CO_2/N_2$ RATIO SETTING EXAMPLE (UNIFORM ROTATION SPEED AND TORQUE)

POWER AIR-FUEL RATIO A/F

FIG. 19

CO2/N2 RATIO SETTING EXAMPLE (UNIFORM ROTATION SPEED AND TORQUE)

POWER TRAIN SYSTEM

TECHNICAL FIELD

The present invention relates to a power train system that uses a spark ignition type internal combustion engine, and particularly, to a power train system having an exhaust gas recirculation function for recirculating a part of an exhaust gas to an internal combustion engine.

BACKGROUND ART

In a spark ignition type internal combustion engine (hereinafter, simply referred to as an internal combustion engine), a technique of allowing a part of an exhaust gas to flow back to an internal combustion engine is widely known as an exhaust gas recirculation (EGR) device. Since a combustion temperature of an air-fuel mixture inside a combustion chamber falls by the recirculation of the exhaust gas, it is possible to reduce the emission of NOx or cooling loss. Further, it is also well known that pumping loss at low and medium loads and preignition and knocking at a high load can be reduced by the recirculation of the exhaust gas.

Incidentally, there is known theoretical thermal efficiency $\eta c$ of the internal combustion engine expressed by the following equation (1) using a compression ratio c and a specific heat ratio $\gamma$.

[Math 1]

$$\eta_C = 1 - \frac{1}{\varepsilon^{\gamma-1}} \quad (1)$$

As illustrated in Equation (1), the theoretical thermal efficiency $\eta_c$ of the internal combustion engine increases as the specific heat ratio $\gamma$ increases. However, the average specific heat ratio $\gamma$ of the entire composition of the exhaust gas is generally about 1.3 and is smaller than the specific heat ratio $\gamma$ of air which is 1.4. Thus, when the ratio of the exhaust gas in the air-fuel mixture increases by the recirculation of the exhaust gas, a problem arises in that the specific heat ratio $\gamma$ of the air-fuel mixture decreases and the theoretical thermal efficiency $\eta_c$ decreases.

As for this problem, for example, in a nitrogen enriched gas supply device of the internal combustion engine illustrated in Japanese Unexamined Patent Application Publication No. 2011-12653 (PTL 1), a nitrogen enriching unit for increasing a nitrogen concentration of the exhaust gas is provided and the exhaust gas having an enriched nitrogen concentration is supplied to an intake path of the internal combustion engine. Since the specific heat ratio $\gamma$ of the nitrogen is about 1.4 and is larger than 1.3 which is the specific heat ratio $\gamma$ of the general exhaust gas, it is possible to improve the thermal efficiency $\eta_c$ of the internal combustion engine compared to a case where the general exhaust gas is recirculated.

CITATION LIST

Patent Literature

PTL 1: Japanese Unexamined Patent Application Publication No. 2011-12653

SUMMARY OF INVENTION

Technical Problem

Incidentally, the internal combustion engine is generally operated in a condition in which a load, a rotation speed, a cooling water temperature, and a fuel property change variously. Thus, it is effective to adjust the composition of the exhaust gas recirculated to the internal combustion engine to be adapted to various conditions from the viewpoint of improving fuel efficiency, reducing harmful components of the exhaust gas, and improving an output. However, in PTL 1 described above, there is no description for adjusting the composition of the exhaust gas recirculated to the internal combustion engine depending on various operation conditions or fuel properties. Thus, it is requested to actually control the composition of the exhaust gas in accordance with the operation conditions or fuel properties.

An object of the invention is to provide a novel power train system capable of improving fuel efficiency, reducing harmful components of an exhaust gas, and improving an output by changing a composition of the exhaust gas recirculated in accordance with operation conditions or fuel properties.

Solution to Problem

The characteristic of the present invention is a power train system including: a spark ignition type internal combustion engine; a gas component separation unit which extracts a plurality of gas components having different specific heat ratios from an exhaust gas of the internal combustion engine; a recirculation unit which recirculates the plurality of gas components to a combustion chamber of the internal combustion engine; and a ratio adjustment unit which adjusts a ratio of the plurality of gas components recirculated to the combustion chamber in response to an operation state or a fuel property state of the internal combustion engine.

Advantageous Effects of Invention

According to the invention, it is possible to adjust the composition of the exhaust gas recirculated to the internal combustion engine in accordance with various operation conditions or fuel properties. Accordingly, it is possible to improve fuel efficiency, reduce harmful components of the exhaust gas, and improve an output in accordance with a wide range of operation conditions of the internal combustion engine or fuel used therein.

DESCRIPTION OF EMBODIMENTS

Next, embodiments of the invention will be described in detail with reference to the drawings, but the invention is not limited to the following embodiments. Then, various modified examples or application examples within the technical concept of the invention are included in the scope of the invention.

First Embodiment

A power train system according to a first embodiment of the invention will be described with reference to FIGS. 1 to 4.

Figure 1:
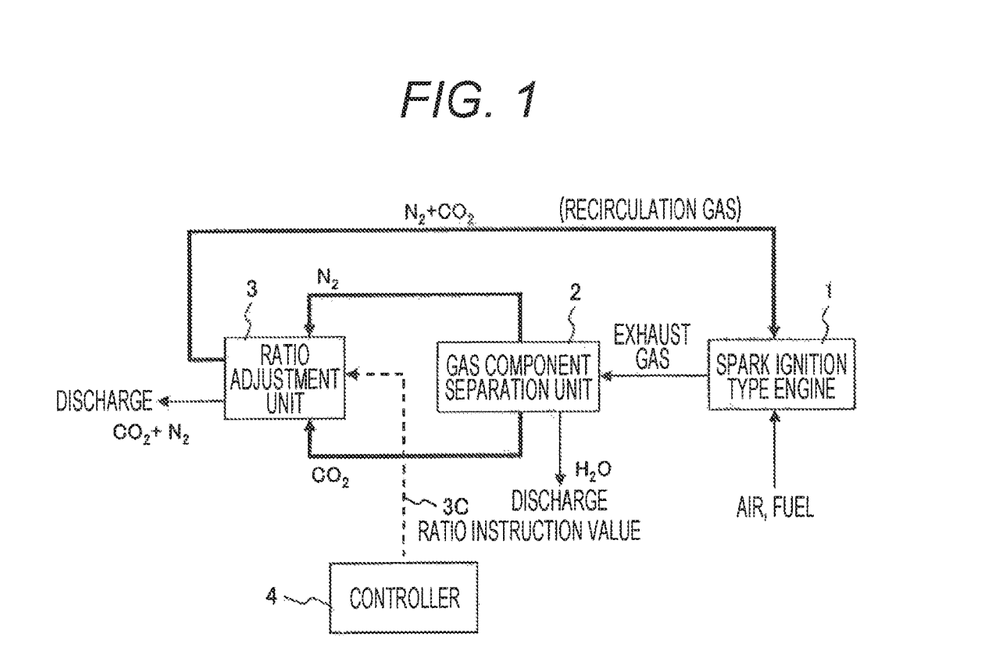
FIG. 1 is a configuration diagram illustrating a configuration of a power train system according to a first embodiment of the invention.

FIG. 1 illustrates a configuration of the power train system. In FIG. 1, Reference Numeral 1 indicates a spark ignition type internal combustion engine, Reference Numeral 2 indicates a gas component separation unit, Reference Numeral 3 indicates a ratio adjustment unit which adjusts a gas component ratio, and Reference Numeral 4 indicates an engine controller which controls the ratio adjustment unit 3.

An exhaust gas of the internal combustion engine 1 is separated into at least components of water $H_2O$, nitrogen $N_2$, and carbon dioxide $CO_2$ by the gas component separation unit 2. The nitrogen $N_2$ and the carbon dioxide $CO_2$ which are separated in this way are adjusted to a predetermined ratio between the nitrogen $N_2$ and the carbon dioxide $CO_2$ by the ratio adjustment unit 3 and are recirculated as a recirculation (EGR) gas to the internal combustion engine 1.

A ratio between the nitrogen $N_2$ and the carbon dioxide $CO_2$ of the recirculation gas is arbitrarily set by a ratio instruction value 3C transmitted from the engine controller 4 to the ratio adjustment unit 3. The extra nitrogen $N_2$ and the carbon dioxide $CO_2$ which are left and not recirculated to the internal combustion engine 1 are discharged to the outside (atmosphere) from the ratio adjustment unit 3.

Figure 2:
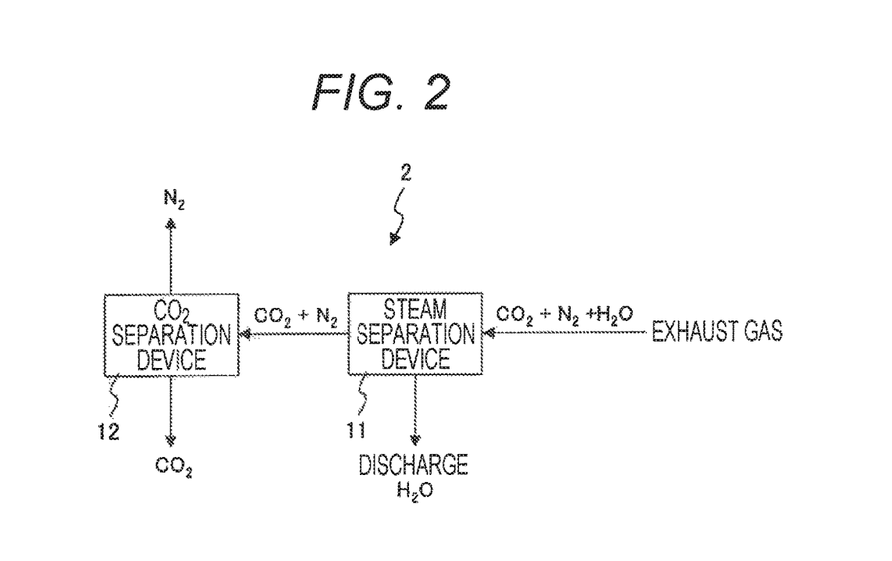
FIG. 2 is a configuration diagram illustrating a configuration of a gas component separation unit.

Next, a configuration of the gas component separation unit 2 will be described with reference to FIG. 2. In FIG. 2, Reference Numeral 11 indicates a steam separation device and Reference Numeral 12 indicates a $CO_2$ separation device. The steam separation device 11 is used to separate the moisture $H_2O$ from the exhaust gas introduced from the internal combustion engine 1 and can be implemented by adsorbing the moisture $H_2O$ in the exhaust gas by, for example, adsorbent such as zeolite. Alternatively, the steam separation device 11 can also be implemented by liquefying the steam in the exhaust gas by a condenser and separating the liquefied moisture by a separator. The steam separation device 11 discharges the separated moisture $H_2O$ to the outside and supplies a mixture gas of the carbon dioxide $CO_2$ and the nitrogen $N_2$ to the $CO_2$ separation device 12.

The $CO_2$ separation device 12 is used to separate the mixture gas of carbon dioxide $CO_2$ and nitrogen $N_2$ into carbon dioxide $CO_2$ and nitrogen $N_2$ and can be implemented by adsorbing $CO_2$ in the mixture gas to, for example, $CO_2$ adsorbent such as activated carbon, zeolite, and solid oxide. Alternatively, the $CO_2$ separation device 12 can also be implemented by filtering the mixture gas by a gas separation membrane. The carbon dioxide $CO_2$ and the nitrogen $N_2$ which are separated by the $CO_2$ separation device 12 are respectively supplied to the ratio adjustment unit 3.

Further, a gas component which is separated by the gas component separation unit 2 does not need to have 100% of purity and may be an enriched gas containing a larger amount of corresponding components than that in the exhaust gas discharged from the internal combustion engine. For example, since the volume ratio of the carbon dioxide $CO_2$ of the exhaust gas at the time of burning gasoline with a theoretical air-fuel mixture is about 10%, the separated carbon dioxide $CO_2$ may be a carbon dioxide $CO_2$ enriched gas containing 20% or more of the carbon dioxide $CO_2$ in volume ratio when the gasoline is burned with the theoretical air-fuel mixture. Further, since the volume ratio of the nitrogen $N_2$ of the exhaust gas is about 70%, for example, when the gasoline is burned with the theoretical air-fuel mixture, the separated nitrogen gas may be a nitrogen $N_2$ enriched gas containing 80% or more of the nitrogen $N_2$ in volume ratio. Further, since the volume ratio of the steam $H_2O$ of the exhaust gas is about 10%, for example, when the gasoline is burned with the theoretical air-fuel mixture, the separated steam $H_2O$ may be a steam $H_2O$ enriched gas containing 20% or more of the steam $H_2O$ in volume ratio.

Figure 3:
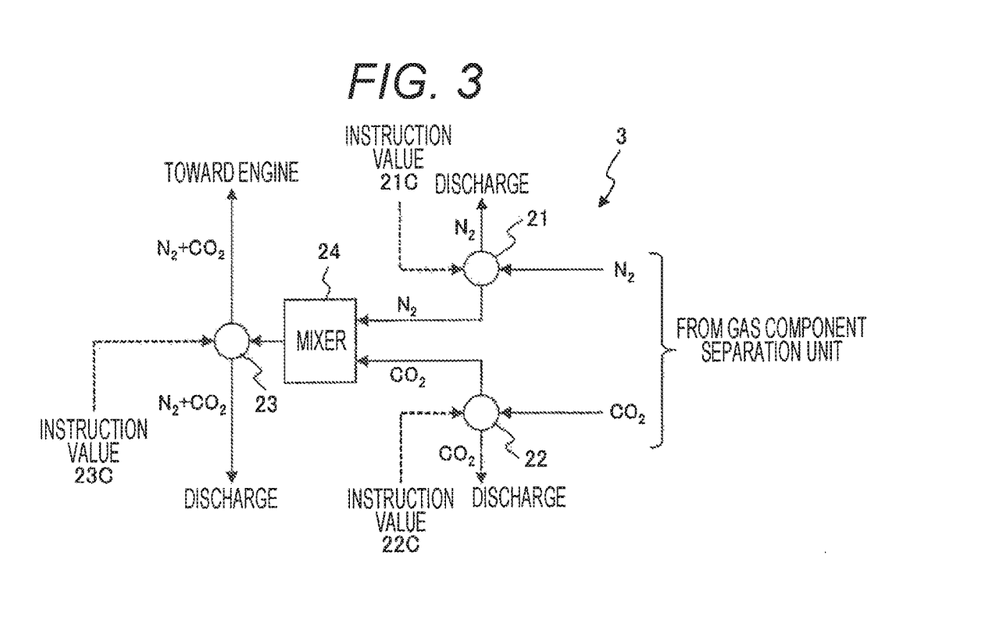
FIG. 3 is a configuration diagram illustrating a configuration of a ratio adjustment unit.

Next, an example of a configuration of the ratio adjustment unit 3 will be described with reference to FIG. 3. In FIG. 3, Reference Numerals 21, 22, and 23 are distribution valves which distribute the introduced gas in two directions and the distribution ratio is arbitrarily set by the instruction value from the engine controller 4. Further, Reference Numeral 24 indicates a mixer which mixes the carbon dioxide $CO_2$ and the nitrogen $N_2$ corresponding to two introduced gas components.

The nitrogen $N_2$ and the carbon dioxide $CO_2$ are respectively introduced into the ratio adjustment unit 3 by the gas component separation unit 2. In the distribution valve 21, a ratio between the nitrogen $N_2$ sent to the mixer 24 and the nitrogen $N_2$ sent to the outside is adjusted based on an instruction value 21C from the engine controller 4. Further, in the distribution valve 22, a ratio between the carbon dioxide $CO_2$ sent to the mixer 24 and the carbon dioxide $CO_2$ sent to the outside is adjusted based on an instruction value 22C from the engine controller 4.

The nitrogen $N_2$ and the carbon dioxide $CO_2$ supplied to the mixer 24 are mixed inside the mixer 24 and the mixture gas of the nitrogen $N_2$ and the carbon dioxide $CO_2$ is sent to the distribution valve 23. In the distribution valve 23, a ratio between the mixture gas recirculated to the internal combustion engine 1 and the mixture gas discharged to the outside is adjusted based on an instruction value 23C from the engine controller 4.

That is, in the ratio adjustment unit 3 with such a configuration, a ratio between the nitrogen $N_2$ and the carbon dioxide $CO_2$ of the mixture gas recirculated to the internal combustion engine 1 is adjusted by the instruction value 21C of the adjustment valve 21 and the instruction value 22C of the adjustment valve 22. Further, the amount of the mixture gas recirculated to the internal combustion engine 1 is adjusted by the instruction value 23C of the adjustment valve 23.

Here, the specific heat ratio γ of the nitrogen $N_2$ is about 1.4 and the specific heat ratio γ of the carbon dioxide $CO_2$ is about 1.3. In this way, since the specific heat ratio γ of the nitrogen $N_2$ is larger than the specific heat ratio γ of the carbon dioxide $CO_2$, there is a function of improving the thermal efficiency. Meanwhile, since the specific heat ratio γ of the carbon dioxide $CO_2$ is smaller than the specific heat ratio γ of the nitrogen $N_2$, the thermal efficiency decreases, in other words, there is a function of lowering the combustion temperature.

In the embodiment, a combustion is controlled by using a difference in the specific heat ratio γ in response to the combustion state of the internal combustion engine. In addition, an expression mentioned herein such that the specific heat ratio γ is large or small is a relative comparison.

Figure 4:
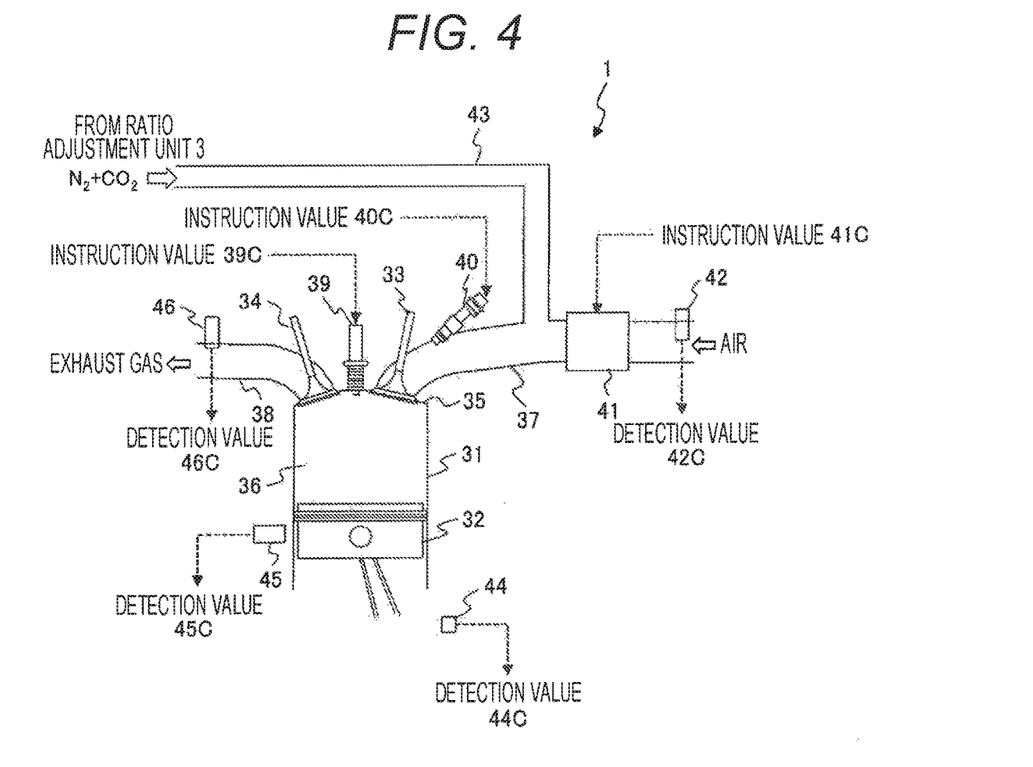
FIG. 4 is a configuration diagram illustrating a configuration of an internal combustion engine according to the invention.

Next, a configuration of the spark ignition type internal combustion engine 1 will be described with reference to FIG. 4. FIG. 4 illustrates a combustion chamber and an intake/exhaust path of a four-cycle spark ignition type internal combustion engine. As widely known, a combustion chamber 36 of the internal combustion engine 1 is formed by a cylinder 31, a piston 32, an intake valve 33, an exhaust valve 34, and a cylinder head 35. In addition, Reference Numeral 37 indicates an intake port, Reference Numeral 38 indicates an exhaust port, and Reference Numeral 41 indicates a throttle valve for adjusting the amount of air taken into the combustion chamber 36.

Further, Reference Numeral 40 indicates a fuel injector which supplies fuel into the intake port 37, Reference Numeral 39 indicates an ignition plug, and Reference Numeral 42 indicates an air flow sensor which detects the amount of air flowing inside the intake port 37. Then, Reference Numeral 43 indicates an EGR pipe which introduces the recirculation gas of the exhaust gas into the intake port 37 and an opening portion thereof is provided at the downstream of the throttle valve 41.

Further, Reference Numeral 44 indicates a crank angle sensor which detects a rotation angle of a crank shaft (not illustrated), Reference Numeral 45 indicates a water temperature sensor which detects a water temperature of a cooling water of the internal combustion engine, and Reference Numeral 46 indicates an O2 sensor which detects an oxygen concentration in the exhaust gas.

An ignition timing of the ignition plug 39 is set by an instruction value 39C from the engine controller 4. Further, a fuel injection amount and a fuel injection timing of the fuel injector 40 are also set by an instruction value 40C from the engine controller 4. Furthermore, the opening degree of the throttle valve 41 is also set by an instruction value 41C from the engine controller 4.

An intake air amount detection value 42C obtained by the air flow sensor 42, a crank angle detection value 44C obtained by the crank angle sensor 44, a water temperature detection value 45C obtained by the water temperature sensor 45, and an O2 concentration detection value 46C obtained by the O2 sensor 46 are respectively transmitted to the engine controller 4.

In the internal combustion engine 1, the air from the intake port 37, the recirculation gas from the EGR pipe 43, and the fuel from the injector 40 are mixed at the downstream of the throttle valve 41 and are introduced into the combustion chamber 36. When the air-fuel mixture compressed inside the combustion chamber by the piston 32 is ignited by the ignition plug 39 and is burned at a predetermined timing, the piston 32 is pressed down by the explosive force thereof and thus a rotational force can be obtained from the internal combustion engine 1.

The fuel which is supplied from the fuel injector 40 is, for example, gasoline, alcohol, a natural gas, propane, hydrogen, or a carbon monoxide gas. These components may be used singly or in combination as the fuel. The fuel is supplied from a fuel tank (not illustrated) to the fuel injector 40 through a fuel pipe (not illustrated).

The amount of the air introduced into the combustion chamber 36 and the amount of the fuel supplied by the fuel injector 40 are feedback-controlled so that the O2 concentration in the exhaust gas detected by the O2 sensor 46 becomes a predetermined value. For example, when gasoline is used as fuel and is burned with a theoretical air-fuel ratio (that is, Stoichiometric combustion), the amount of the gasoline from the fuel injector 40 is adjusted by the instruction value 40C so that the gasoline and the air have a mass ratio of 1 to 15. Similarly, the amount of the air introduced from the throttle valve 41 is adjusted by the instruction value 41C. In any case, the air-fuel ratio is adjusted by adjusting any one or both the air amount and the fuel amount.

Then, in the above-described internal combustion engine 1, it is operated under a wide range of operation conditions. For example, in the internal combustion engine of an automobile, a wide-range operation is performed from an idle operation to a full open operation according to a stepping amount of an accelerator pedal. Then, it is necessary to reasonably perform the recirculation of the recirculation gas in which a composition of the exhaust gas is adjusted within the wide range of operations.

Figure 5:
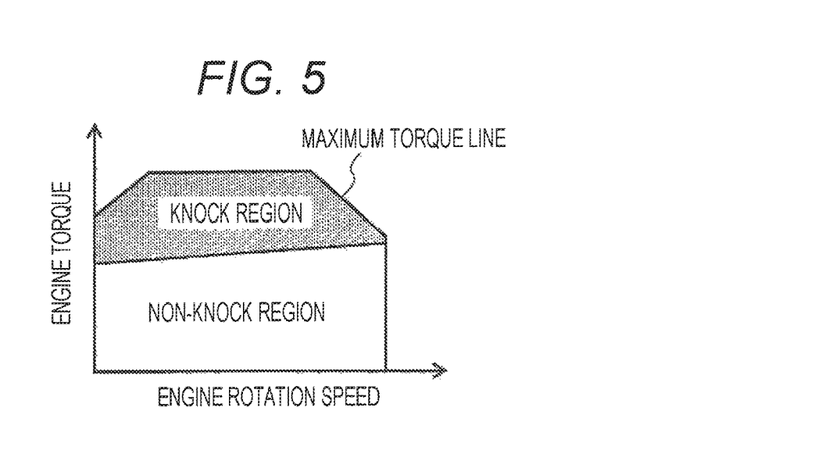
FIG. 5 is an explanatory diagram illustrating a knock region and a non-knock region in a plane having a rotation speed and an engine torque.

FIG. 5 illustrates a region (a non-knock region) in which the knocking hardly occurs and a region (a knock region) in which the knocking easily occurs in a plane of the rotation speed of the internal combustion engine and the engine torque of the internal combustion engine (in the drawings, the engine torque).

First, if the engine torque is considered, since a gas temperature inside the combustion chamber is relatively low from a low torque (a low load) to a medium torque (a medium load), there is a tendency that the knocking hardly occurs. On the contrary, there is a tendency that the knocking easily occurs in accordance with an increase in gas temperature inside the combustion chamber in a high torque (a high load) region.

Meanwhile, if the rotation speed of the internal combustion engine is considered, the knock region is widened in a low torque direction when the rotation speed decreases. This is because a flame propagation speed inside the combustion chamber becomes low when the rotation speed of the internal combustion engine becomes low. That is, when a flame is propagated slowly, the unburned gas is kept at a high temperature for a longer time and the self-ignition reaction of the unburned gas easily occurs.

Then, according to the conventional method, the ignition timing of the ignition plug is retarded compared to a maximum torque generation ignition timing (MBT) or the air-fuel ratio is enriched so that the amount of the fuel increases in the knock region, whereby a gas temperature inside the combustion chamber is lowered and the knocking is prevented. However, since such a knocking preventing method causes deterioration in fuel efficiency of the internal combustion engine or a decrease in output thereof and an increase in exhaust gas emission amount, there is a strong request for improvement.

Here, in the embodiment of the invention, the exhaust gas of which the composition of the gas component is adjusted in response to the operation condition is recirculated.

Figure 6:
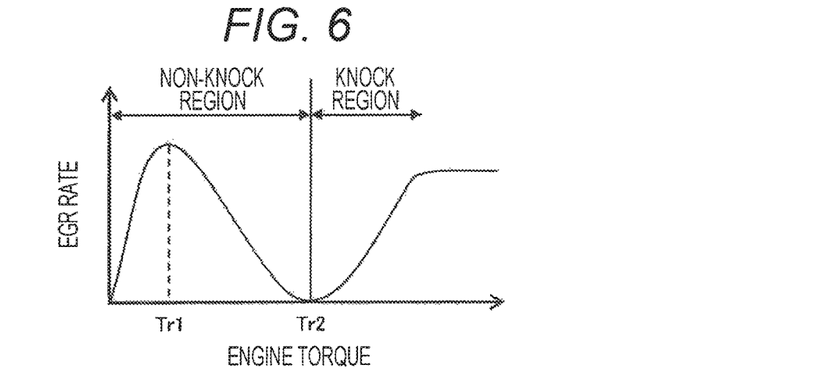
FIG. 6 is an explanatory diagram illustrating an EGR rate setting example with respect to an engine torque.

FIG. 6 illustrates an example of setting the EGR rate of the embodiment. FIG. 6 illustrates an example of setting the EGR rate with respect to the engine torque in a certain rotation speed region of the internal combustion engine. Here, the EGR rate is defined by the following equation (2). In the following equation (2), the EGR rate is indicated by EGRrate, the recirculation gas mass is indicated by EGRmass, the intake air mass is indicated by AIRmass, and the fuel mass is indicated by FUELmass.

[Math 2]

$$EGRrate = EGRmass/(AIRmass + EGRmass + FUELmass) \quad (2)$$

In the non-knock region, the EGR rate is set to a large value in response to an increase in torque from a minimum torque to a predetermined first engine torque Tr1. Further, the EGR rate is set to a small value in response to an increase in torque after the first engine torque Tr1. In the non-knock region, the exhaust gas is recirculated to reduce pumping loss. That is, when the internal combustion engine is in a low load state, pumping loss is caused when air is throttled by the throttle valve. Then, since a gas pressure inside the combustion chamber in the intake cycle increases when the ratio of the recirculation gas is increased to increase the amount of the gas introduced into the combustion chamber, pumping loss can be decreased.

However, since the combustion temperature is lowered by the recirculation of the exhaust gas, the temperature decreases too much at an extremely low load so that stable flame propagation is difficult. Thus, it is desirable to set the EGR rate to be low at the extremely low load. Further, since the opening degree of the throttle valve increases in accordance with an increase in torque, pumping loss decreases. Thus, it is desirable to set the EGR rate to be low in accordance with an increase in torque after the first engine torque Tr1.

Meanwhile, the EGR rate is set to be high and almost uniform in accordance with an increase in torque after a predetermined second engine torque Tr2 which is a knock region in which the knock easily occurs. Since the unburned gas temperature is lowered by the introduction and the recirculation of the exhaust gas in the knock region, the knocking can be suppressed. Since the knocking easily occurs in accordance with an increase in torque, it is desirable to set the EGR rate to be high in accordance with an increase in torque. Here, since a misfire is easily caused when the EGR rate is set to be large, the EGR rate is kept substantially uniform even when the torque increases.

Next, a method of controlling the recirculation of the exhaust gas of which the composition of the exhaust gas is controlled in response to the knock region and the non-knock region will be described from the same viewpoint as that of the description above.

Figure 7:
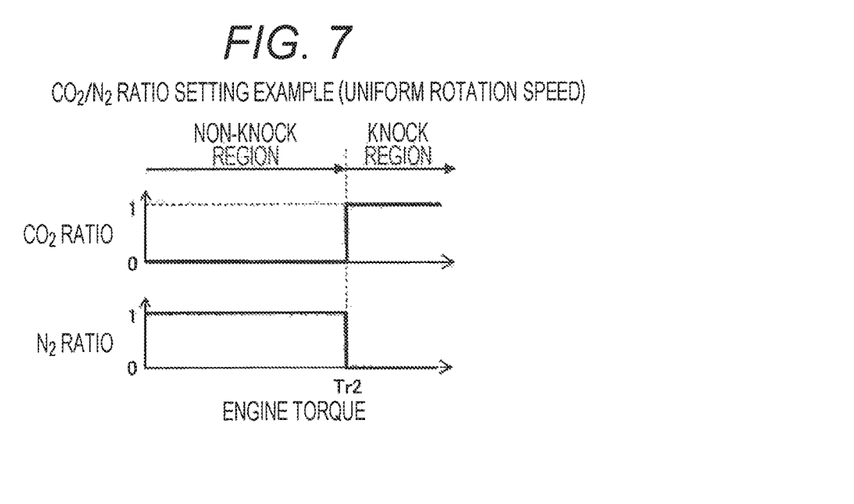
FIG. 7 is an explanatory diagram illustrating a first example of setting a ratio between a carbon dioxide $CO_2$ and a nitrogen $N_2$ with respect to an engine torque.
Figure 8:
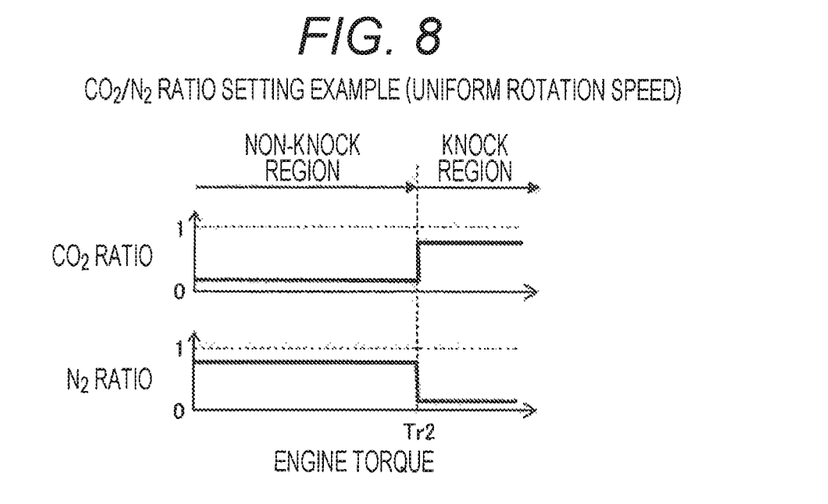
FIG. 8 is an explanatory diagram illustrating a second example of setting a ratio between a carbon dioxide $CO_2$ and a nitrogen $N_2$ with respect to an engine torque.
Figure 9:
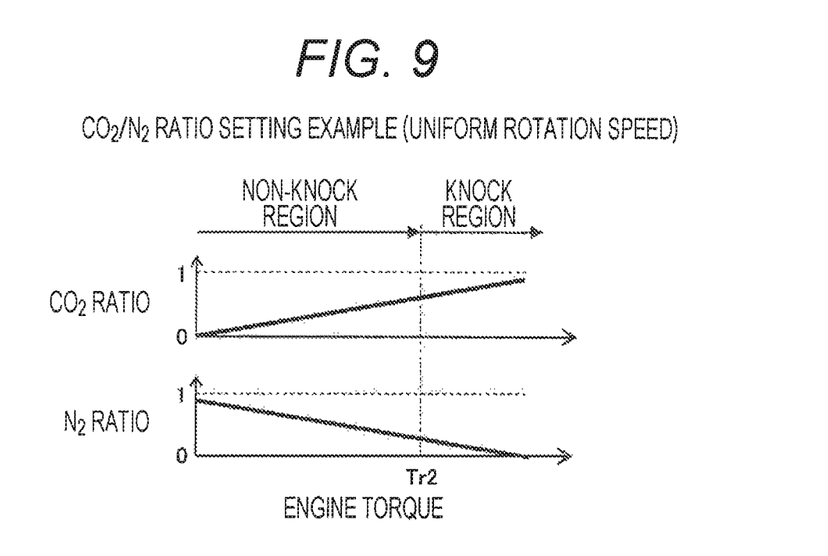
FIG. 9 is an explanatory diagram illustrating a third example of setting a ratio between a carbon dioxide $CO_2$ and a nitrogen $N_2$ with respect to an engine torque.

FIGS. 7 to 9 illustrate an example of adjusting the ratio between the carbon dioxide $CO_2$ and the nitrogen $N_2$ of the recirculation gas with respect to a change in engine torque of the internal combustion engine. In the embodiment, as illustrated in FIGS. 7 to 9, the ratio of the nitrogen $N_2$ of the exhaust gas to be recirculated in the non-knock region is set to be high and the ratio of the carbon dioxide $CO_2$ of the exhaust gas to be recirculated in the knock region is set to be high. This ratio will be described simply below.

In FIGS. 7 to 9, the ratio between the nitrogen $N_2$ and the carbon dioxide $CO_2$ is adjusted by using the second torque Tr2 as a boundary in FIG. 6. In addition, the ratio can be changed by the distribution valves 21 and 22 of the ratio adjustment unit 3 illustrated in FIG. 3. Further, the recirculation of the exhaust gas of which the composition of the gas component is controlled can be performed by the distribution valve 23.

In FIG. 7, in the non-knock region in which the engine torque is smaller than the second engine torque Tr2 while the rotation speed is uniform, the ratio of the nitrogen $N_2$ is set to 100% and the ratio of the carbon dioxide $CO_2$ is set to 0%. Then, in the knock region in which the engine torque is larger than the second engine torque Tr2 while the rotation speed is uniform, the ratio of the nitrogen $N_2$ is set to 0% and the ratio of the carbon dioxide $CO_2$ is set to 100%. In this way, only a predetermined amount of the exhaust gas with the above-described composition is recirculated to the internal combustion engine.

In FIG. 8, in the non-knock region in which the engine torque is smaller than the second engine torque Tr2 while the rotation speed is uniform, for example, the ratio of the nitrogen $N_2$ is set to 80% and the ratio of the carbon dioxide $CO_2$ is set to 20%. Then, in the knock region in which the engine torque is larger than the second engine torque Tr2 while the rotation speed is uniform, the ratio of the nitrogen $N_2$ is set to 20% and the ratio of the carbon dioxide $CO_2$ is set to 80%. In this way, only a predetermined amount of the exhaust gas with the above-described composition is recirculated to the internal combustion engine.

In FIG. 9, in a state where the engine torque is small while the rotation speed is uniform, for example, the ratio of the nitrogen $N_2$ is set to 100% and the ratio of the carbon dioxide $CO_2$ is set to 0%. Then, the ratio of the nitrogen $N_2$ is gradually decreased in accordance with an increase in engine torque, whereas the ratio of the carbon dioxide $CO_2$ is gradually increased in accordance with an increase in engine torque. Finally, only a predetermined amount of the exhaust gas with the composition containing 0% of the nitrogen $N_2$ and 100% of the carbon dioxide $CO_2$ is recirculated to the internal combustion engine.

Figure 10:
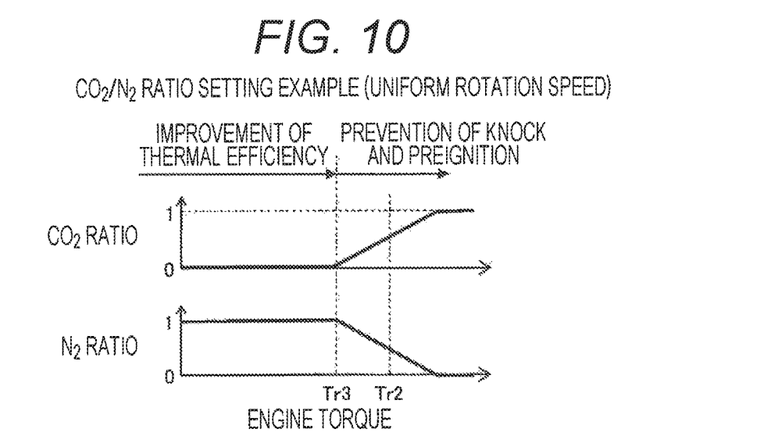
FIG. 10 is an explanatory diagram illustrating a fourth example of setting a ratio between a carbon dioxide $CO_2$ and a nitrogen $N_2$ with respect to an engine torque.

FIG. 10 illustrates a ratio from the viewpoint of the thermal efficiency instead of the viewpoint of the non-knock region. In FIG. 10, in a region in which the engine torque is smaller than an engine torque Tr3 slightly smaller than the second engine torque Tr2 while the rotation speed is uniform, the ratio of the nitrogen $N_2$ is set to 100% and the ratio of the carbon dioxide $CO_2$ is set to 0%. Then, in a region in which the engine torque is larger than the engine torque Tr3 slightly smaller than the second engine torque Tr2, the ratio of the nitrogen $N_2$ is gradually decreased in accordance with an increase in engine torque, whereas the ratio of the carbon dioxide $CO_2$ is gradually increased in accordance with an increase in engine torque. Finally, only a predetermined amount of the exhaust gas with the composition containing 0% of the nitrogen $N_2$ and 100% of the carbon dioxide $CO_2$ is recirculated to the internal combustion engine.

In this way, when the ratio between the carbon dioxide $CO_2$ and the nitrogen $N_2$ are changed in accordance with the non-knock region and the knock region or the thermal efficiency, the following effect can be obtained.

As described above, the thermal efficiency of the internal combustion engine increases as the specific heat ratio $\gamma$ is large. The specific heat ratio $\gamma$ of the nitrogen $N_2$ is about 1.4 and the specific heat ratio $\gamma$ of the carbon dioxide $CO_2$ is about 1.3. In this way, the specific heat ratio $\gamma$ of the nitrogen $N_2$ is relatively larger than the specific heat ratio of the carbon dioxide $CO_2$. Thus, since the specific heat ratio $\gamma$ of the air-fuel mixture increases when the ratio of the nitrogen $N_2$ is increased in the non-knock region, high thermal efficiency can be obtained. This is also illustrated in FIG. 10.

Meanwhile, the unburned gas temperature $T_{TDC}$ (the compression end temperature) compressed in the compression cycle is expressed by Equation (3) and the unburned gas temperature $T_{TDC}$ decreases as the specific heat ratio $\gamma$ decreases. In addition, $T_{BDC}$ indicates the unburned gas temperature before the start of the compression, e indicates the compression ratio, and $\gamma$ indicates the specific heat ratio.

[Math 3]

$$T_{TDC} = T_{BCD} \varepsilon^{\gamma-1} \qquad (3)$$

In this way, in the embodiment, since the specific heat ratio $\gamma$ of the air-fuel mixture decreases and the unburned gas temperature $T_{TDC}$ decreases when the ratio of the carbon dioxide $CO_2$ of the recirculation gas of the knock region is increased, the occurrence of the knocking can be suppressed.

Further, it is known that a turbulent combustion speed of the air-fuel mixture of fuel and air diluted with the carbon dioxide $CO_2$ becomes high compared to the air-fuel mixture of fuel and air diluted with the nitrogen $N_2$. When the combustion speed is high, flame propagation is completed before the unburned gas self-ignites and thus knocking is less likely to occur. That is, when the single component of the carbon dioxide $CO_2$ or the carbon dioxide $CO_2$ enriched gas separated from the exhaust gas is used as a recirculation exhaust gas, it is possible to obtain a high knock suppression effect in terms of both the specific heat ratio and the combustion speed. In this way, in the embodiment, since the combustion speed becomes high when the ratio of the carbon dioxide $CO_2$ of the recirculation gas in the knock region is increased, the occurrence of the knocking can be suppressed.

Further, there is concern that the preignition may occur in the knock region. This is a phenomenon in which the lubricating oil or the cylinder wall surface heated by a high-load operation in the internal combustion engine heats the air-fuel mixture of fuel and air so that the air-fuel mixture self-ignites before the ignition timing. In the embodiment, since the unburned gas temperature $T_{TDC}$ becomes low when the ratio of the carbon dioxide $CO_2$ of the recirculation gas in the knock region is increased as illustrated in FIG. 10, the occurrence of the preignition can also be suppressed.

As described above, there is concern that the knocking damages the internal combustion engine by the vibration or the heat emission. For this reason, in the conventional method, it is general to suppress the occurrence of the knocking by setting the ignition timing to be later than the maximum torque generation point (MBT) or setting the air-fuel ratio so that the amount of the fuel increases in a region in which the knocking occurs. However, in such a method, there is a problem in which the fuel efficiency of the internal combustion engine is degraded.

On the contrary, in the embodiment, since it is possible to suppress the knocking by increasing the ratio of the carbon dioxide $CO_2$ which is a component constituting the exhaust gas to be recirculated, it is possible to further reduce the fuel efficiency in the knock region. Further, high thermal efficiency is obtained by increasing the specific heat ratio of the air-fuel mixture of fuel and air by increasing the ratio of the nitrogen $N_2$ in a region in which the knocking hardly occurs. Thus, according to the embodiment, it is possible to suppress the knock in a wide operation region of the internal combustion engine and to improve the fuel efficiency in the entire operation region.

Figure 11:
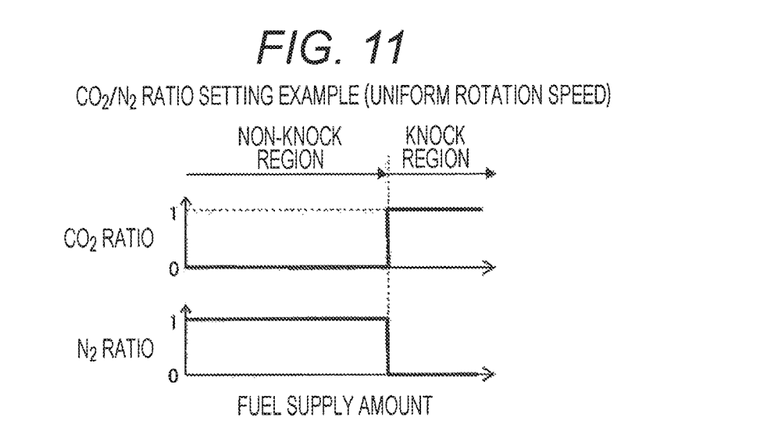
FIG. 11 is an explanatory diagram illustrating an example of setting a ratio between a carbon dioxide $CO_2$ and a nitrogen $N_2$ with respect to a fuel supply amount.

Further, since there is generally a primary correlation between the engine torque and the fuel supply amount (the fuel injection amount) of the internal combustion engine, the ratio between the carbon dioxide $CO_2$ and the nitrogen $N_2$ of the recirculation gas may be set based on the fuel supply amount (the fuel injection amount) for each cycle as illustrated in FIG. 11 instead of the engine torque illustrated in FIGS. 7 to 10.

In FIGS. 7 to 10, the ratio between the carbon dioxide $CO_2$ and the nitrogen $N_2$ is determined based on the engine torque corresponding to an axis, but an example of determining the ratio between the carbon dioxide $CO_2$ and the nitrogen $N_2$ by parameters different from the engine torque will be described below.

Figure 12:
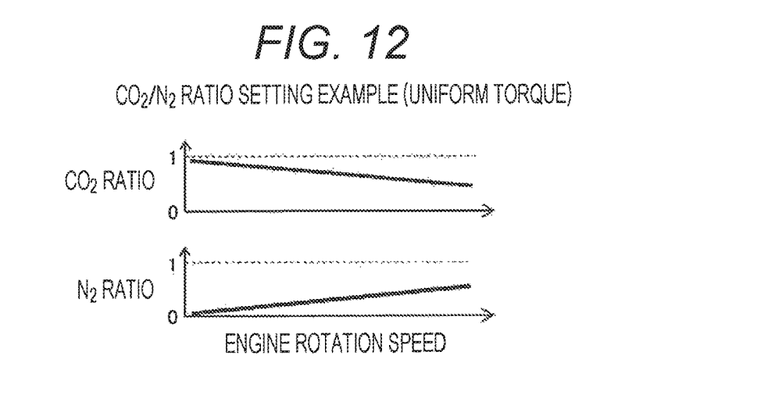
FIG. 12 is an explanatory diagram illustrating an example of setting a ratio between a carbon dioxide $CO_2$ and a nitrogen $N_2$ with respect to a rotation speed.

FIG. 12 illustrates an example of setting the ratio between the carbon dioxide $CO_2$ and the nitrogen $N_2$ of the recirculation gas with respect to the rotation speed based on the uniformly high engine torque. In FIG. 12, in a state where the rotation speed is low, for example, the ratio of the nitrogen $N_2$ is set to 0% and the ratio of the carbon dioxide $CO_2$ is set to 100%. Then, the ratio of the nitrogen $N_2$ is gradually increased in accordance with an increase in rotation speed, whereas the ratio of the carbon dioxide $CO_2$ is gradually decreased in accordance with an increase in rotation speed. Finally, only a predetermined amount of the exhaust gas with the composition containing 100% of the nitrogen $N_2$ and 0% of the carbon dioxide $CO_2$ is recirculated to the internal combustion engine.

In the embodiment, the ratio of the carbon dioxide $CO_2$ of the recirculation gas is set to be high and the ratio of the nitrogen $N_2$ of the recirculation gas is set to be low in accordance with a decrease in rotation speed in the operation at a high engine torque. This is because the combustion speed becomes low with a decrease in rotation speed so that the knocking easily occurs in a condition of the high engine torque. Further, since the heat receiving time of the unburned gas from a high heat source becomes long in accordance with a decrease in rotation speed, the preignition also easily occurs.

In the embodiment, since the ratio of the carbon dioxide $CO_2$ of the recirculation gas is set to be high and the ratio of the nitrogen $N_2$ of the recirculation gas is set to be low in accordance with a decrease in rotation speed, it is possible to suppress the occurrence of the knocking or the preignition by decreasing the unburned gas temperature and increasing the combustion speed under conditions in which the knocking or the preignition easily occurs. Further, it is possible to obtain high thermal efficiency when the ratio of the nitrogen $N_2$ of the recirculation gas is increased to increase the specific heat ratio $\gamma$ of the air-fuel mixture of fuel and air under conditions in which the rotation speed increases so that the knocking or the preignition does not occur.

Further, in the above-described ratio setting method, the ratio between the carbon dioxide $CO_2$ and the nitrogen $N_2$ is set by using one parameter such as an engine torque, a fuel supply amount, or a rotation speed.

Figure 13:
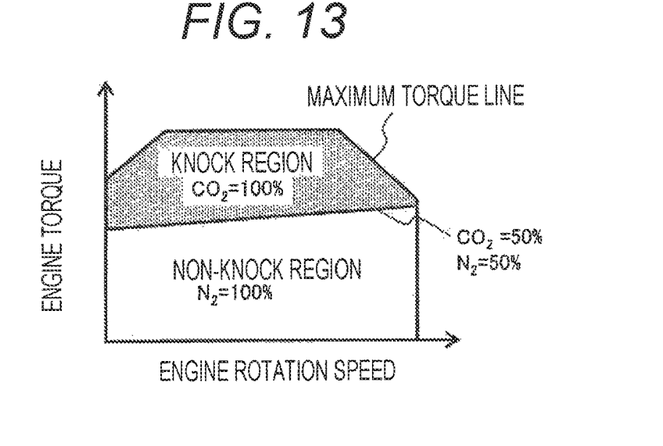
FIG. 13 is an explanatory diagram illustrating an example of setting a ratio between a carbon dioxide $CO_2$ and a nitrogen $N_2$ with respect to a plane of a rotation speed and an engine torque.

On the contrary, FIG. 13 illustrates an example of setting the ratio between the carbon dioxide $CO_2$ and the nitrogen $N_2$ of the recirculation gas on the plane of the rotation speed and the engine torque of the internal combustion engine. Here, the ratio of the carbon dioxide $CO_2$ is set to 100% in the knock region and the ratio of the nitrogen $N_2$ in the non-knock region is set to 100%. Then, in the vicinity of the boundary between the knock region and the non-knock region, the ratio of the carbon dioxide $CO_2$ is set to 50% and the ratio of the nitrogen $N_2$ is set to 50%.

Thus, it is possible to obtain the high thermal efficiency and to suppress the knocking in a wide operation region by setting the ratio between the carbon dioxide $CO_2$ and the nitrogen $N_2$ of the recirculation gas in response to the rotation speed and the engine torque of the internal combustion engine.

Further, several parameters changing the easiness of the knocking or the preignition are supposed other than the engine torque or the rotation speed of the internal combustion engine. There is no need to mention that the ratio between the carbon dioxide $CO_2$ and the nitrogen $N_2$ of the recirculation gas may be set in response to the parameter values. Several examples will be described below.

Figure 14:
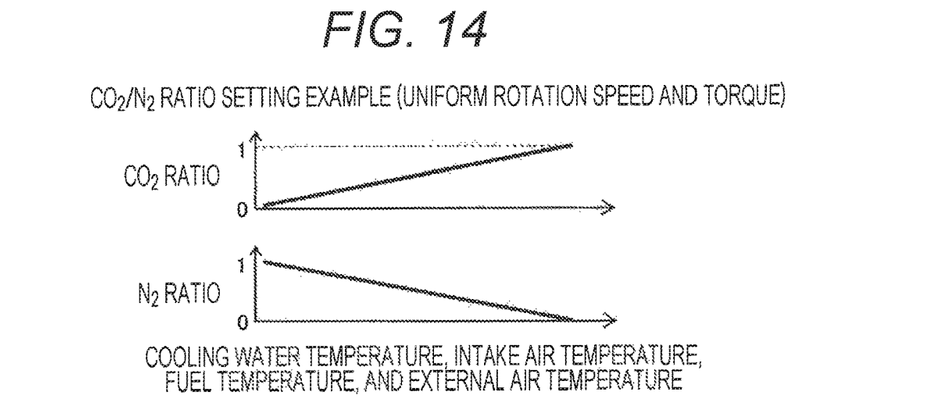
FIG. 14 is an explanatory diagram illustrating an example of setting a ratio between a carbon dioxide $CO_2$ and a nitrogen $N_2$ with respect to a cooling water temperature, an intake air temperature, a fuel temperature, and an external air temperature.

In FIG. 14, the ratio between the carbon dioxide $CO_2$ and the nitrogen $N_2$ of the recirculation gas can be set by the temperature parameters such as a cooling water temperature, an intake air temperature, a fuel temperature, and an external air temperature. These temperatures involving with the operation of the internal combustion engine have a tendency that the knocking or the preignition easily occurs in accordance with an increase in temperature.

In FIG. 14, in a state where the temperature is low while the rotation speed and the engine torque are uniform, for example, the ratio of the nitrogen $N_2$ is set to 100% and the ratio of the carbon dioxide $CO_2$ is set to 0%. Then, the ratio of the nitrogen $N_2$ is gradually decreased in accordance with an increase in temperature, whereas the ratio of the carbon dioxide $CO_2$ is increased in accordance with an increase in temperature. Finally, only a predetermined amount of the exhaust gas with the composition containing 0% of the nitrogen $N_2$ and 100% of the carbon dioxide $CO_2$ is recirculated to the internal combustion engine. In addition, the temperature in use has a priority in order of (1) the cooling water temperature, (2) the intake air temperature, (3) the fuel temperature, and (3) the external air temperature. Thus, it is desirable to use a temperature of a parameter influencing the operation of the internal combustion engine.

Figure 15:
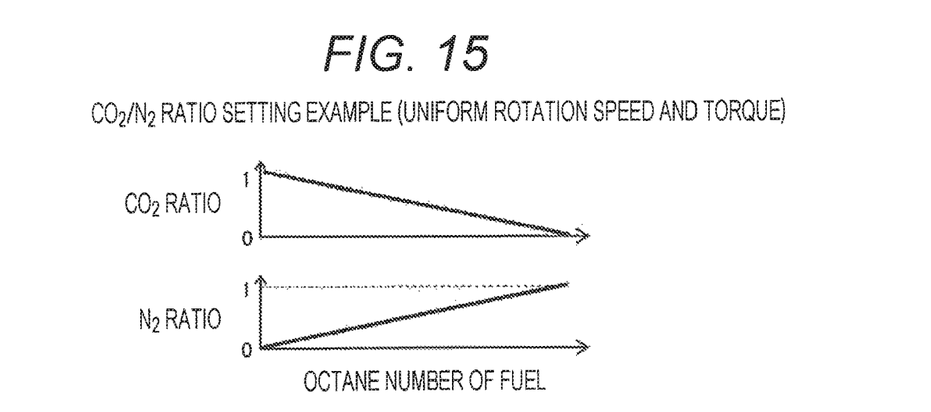
FIG. 15 is an explanatory diagram illustrating an example of setting a ratio between a carbon dioxide $CO_2$ and a nitrogen $N_2$ with respect to an octane number of fuel.

In FIG. 15, the ratio between the carbon dioxide $CO_2$ and the nitrogen $N_2$ of the recirculation gas can be set in response to the octane number of the fuel. In FIG. 15, in a state where the octane number is small while the rotation speed and the engine torque are uniform, for example, the ratio of the nitrogen $N_2$ is set to 0% and the ratio of the carbon dioxide $CO_2$ is set to 100%. Then, the ratio of the nitrogen $N_2$ is gradually increased in accordance with an increase in octane number, whereas the ratio of the carbon dioxide $CO_2$ is gradually decreased in accordance with an increase in octane number. Finally, only a predetermined amount of the exhaust gas with the composition containing 100% of the nitrogen $N_2$ and 0% of the carbon dioxide $CO_2$ is recirculated to the internal combustion engine.

Figure 16:
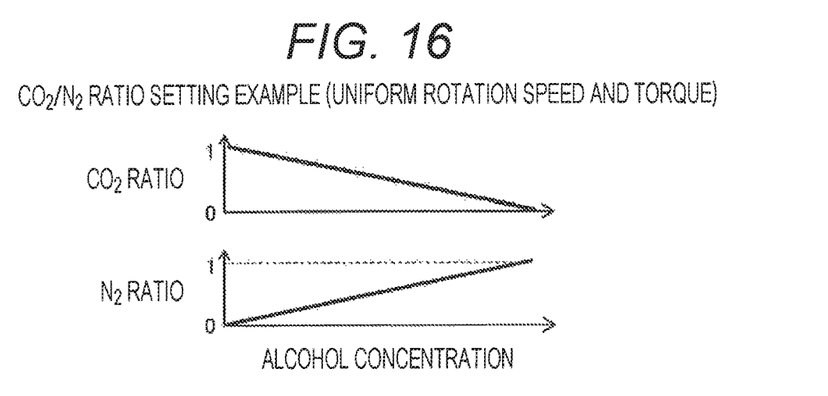
FIG. 16 is an explanatory diagram illustrating an example of setting a ratio between a carbon dioxide $CO_2$ and a nitrogen $N_2$ with respect to an alcohol concentration.

In FIG. 16, the ratio between the carbon dioxide $CO_2$ and the nitrogen $N_2$ of the recirculation gas can be set in response to the alcohol concentration of the fuel. In the fuel obtained by mixing the gasoline and the alcohol, since an effect of suppressing the knocking or the preignition by the vaporization cooling of alcohol decreases when the alcohol concentration of the fuel decreases, this decrease in effect needs to be compensated.

In FIG. 16, in a state where the alcohol concentration is small while the rotation speed and the engine torque are uniform, for example, the ratio of the nitrogen $N_2$ is set to 0% and the ratio of the carbon dioxide $CO_2$ is set to 100%. Then, the ratio of the nitrogen $N_2$ is gradually increased in accordance with an increase in alcohol concentration, whereas the ratio of the carbon dioxide $CO_2$ is gradually decreased in accordance with an increase in alcohol concentration. Finally, only a predetermined amount of the exhaust gas with the composition containing 100% of the nitrogen $N_2$ and 0% of the carbon dioxide $CO_2$ is recirculated to the internal combustion engine.

Figure 17:
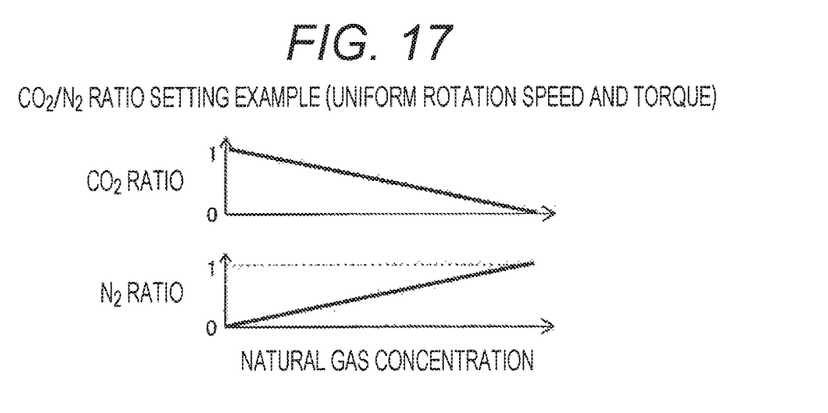
FIG. 17 is an explanatory diagram illustrating an example of setting a ratio between a carbon dioxide $CO_2$ and a nitrogen $N_2$ with respect to a natural gas concentration.

In FIG. 17, the ratio between the carbon dioxide $CO_2$ and the nitrogen $N_2$ of the recirculation gas can be set in response to the natural gas concentration of the fuel. In the fuel obtained by mixing the gasoline and the natural gas, since an effect of suppressing the knocking or the preignition by decreasing the octane number of the fuel decreases when the natural gas concentration of the fuel decreases, this decrease in effect needs to be compensated.

In FIG. 17, in a state where the natural gas concentration is small while the rotation speed and the engine torque are uniform, for example, the ratio of the nitrogen $N_2$ is set to 0% and the ratio of the carbon dioxide $CO_2$ is set to 100%. Then, the ratio of the nitrogen $N_2$ is gradually increased in accordance with an increase in alcohol concentration, whereas the ratio of the carbon dioxide $CO_2$ is gradually decreased in accordance with an increase in natural gas concentration. Finally, only a predetermined amount of the exhaust gas with the composition containing 100% of the nitrogen $N_2$ and 0% of the carbon dioxide $CO_2$ is recirculated to the internal combustion engine.

Figure 18:
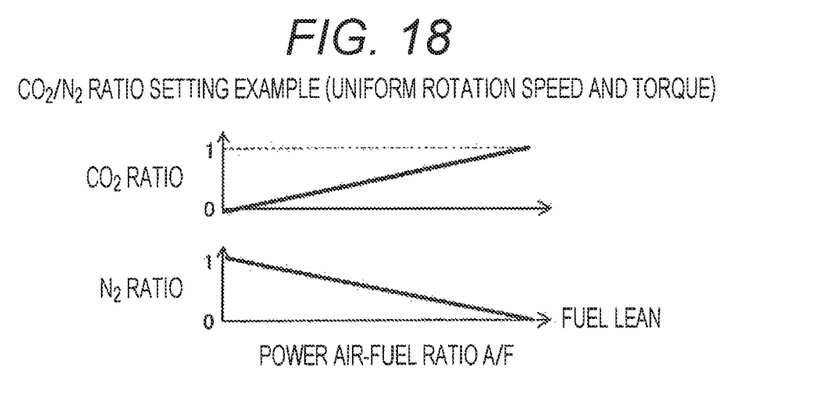
FIG. 18 is an explanatory diagram illustrating an example of setting a ratio between a carbon dioxide $CO_2$ and a nitrogen $N_2$ with respect to a power air-fuel ratio.

In FIG. 18, the ratio between the carbon dioxide $CO_2$ and the nitrogen $N_2$ of the recirculation gas can be set in response to the power air-fuel ratio in the high-load operation state. When the air-fuel ratio (the power air-fuel ratio) set in the high-load operation state increases (the lean side), the temperature of the unburned air-fuel mixture increases so that the knocking or the preignition easily occurs. Accordingly, this problem needs to be compensated.

In FIG. 18, in a state where the power air-fuel ratio is set to a predetermined rich side while the rotation speed and the engine torque are uniform, for example, the ratio of the nitrogen $N_2$ is set to 100% and the ratio of the carbon dioxide $CO_2$ is set to 0%. Then, the ratio of the nitrogen $N_2$ is gradually decreased as the air-fuel ratio moves to the lean side, whereas the ratio of the carbon dioxide $CO_2$ is gradually increased as the air-fuel ratio moves to the lean side. Finally, only a predetermined amount of the exhaust gas with the composition containing 0% of the nitrogen $N_2$ and 100% of the carbon dioxide $CO_2$ is recirculated to the internal combustion engine.

Figure 19:
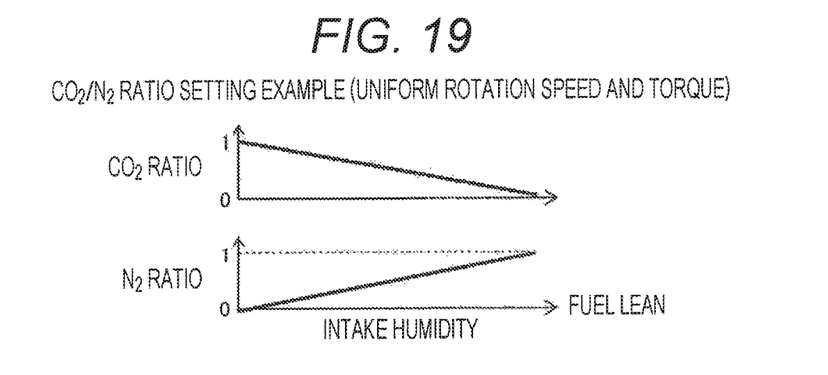
FIG. 19 is an explanatory diagram illustrating an example of setting a ratio between a carbon dioxide $CO_2$ and a nitrogen $N_2$ with respect to an intake humidity.

In FIG. 19, the ratio between the carbon dioxide $CO_2$ and the nitrogen $N_2$ of the recirculation gas can be set in response to the humidity (the relative humidity) of the intake air taken into the internal combustion engine. When the intake humidity increases, the temperature of the unburned air-fuel mixture decreases and thus the knocking or the preignition hardly occurs. Thus, in FIG. 19, in a state where the intake humidity is low while the rotation speed and the engine torque are uniform, for example, the ratio of the nitrogen $N_2$ is set to 0% and the ratio of the carbon dioxide $CO_2$ is set to 100%. Then, the ratio of the nitrogen $N_2$ is gradually increased as the intake humidity increases, whereas the ratio of the carbon dioxide $CO_2$ is gradually decreased as the intake humidity increases. Finally, only a predetermined amount of the exhaust gas with the composition containing 100% of the nitrogen $N_2$ and 0% of the carbon dioxide $CO_2$ is recirculated to the internal combustion engine. In addition, the intake humidity can be detected by, for example, a humidity sensor attached to the air flow sensor.

As described above, in the embodiment, since the nitrogen $N_2$ and the carbon dioxide $CO_2$ are extracted from the exhaust gas of the internal combustion engine and the ratio is controlled in response to the operation state or the fuel property state, it is possible to improve fuel efficiency, reduce harmful components of the exhaust gas, and improve an output in a wide range of operation conditions of the internal combustion engine.

Second Embodiment

In the above-described embodiment, the gas components controlled in the composition components of the exhaust gas are the carbon dioxide $CO_2$ and the nitrogen $N_2$. Here, the specific heat ratio $\gamma$ of the steam $H_2O$ is about 1.33 and is smaller than 1.4 which is the specific heat ratio $\gamma$ of the nitrogen $N_2$. Thus, since the ratio of the steam $H_2O$ of the recirculation gas is set to be large and the specific heat ratio $\gamma$ of the air-fuel mixture is set to be small in the knock region, the knocking or the preignition can be suppressed. Based on this viewpoint, a power train system according to a second embodiment of the invention is illustrated in FIG. 20.

Figure 20:
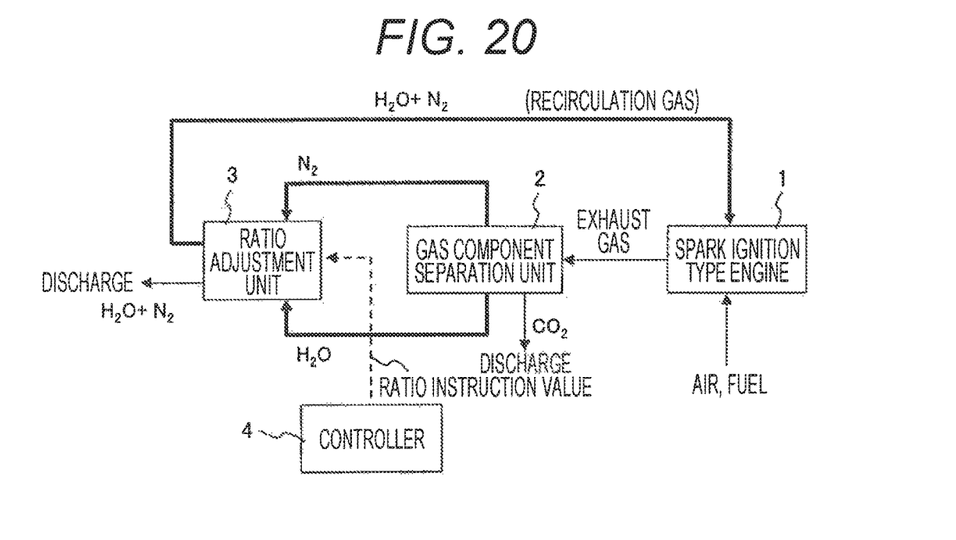
FIG. 20 is a configuration diagram illustrating a configuration of a power train system according to a second embodiment of the invention.

In the power train system illustrated in FIG. 20, the moisture $H_2O$ of the steam obtained by the gas component separation unit 2 is introduced into the ratio adjustment unit 3. Since other configurations are similar to those of the power train system of the first embodiment, a description thereof will be omitted.

Further, the moisture $H_2O$ of the steam separated by the gas component separation unit 2 may be an enriched gas having a large amount of the corresponding component (moisture) compared to the exhaust gas discharged from the internal combustion engine. For example, when the gasoline is burned with a theoretical air-fuel mixture, a moisture $H_2O$ enriched gas including the moisture $H_2O$ of about the volume ratio of 20% or more may be used.

Then, in the second embodiment of the invention, the nitrogen $N_2$ and the water $H_2O$ are adjusted to have a predetermined ratio between the nitrogen $N_2$ and the moisture $H_2O$ by the ratio adjustment unit 3 and are recirculated to the internal combustion engine 1 as a recirculation (EGR) gas. The ratio between the nitrogen $N_2$ and the water $H_2O$ of the recirculation gas is arbitrarily set by a ratio instruction value transmitted from the engine controller 4 to the ratio adjustment unit 3. The extra nitrogen $N_2$ and the water $H_2O$ which are left and not recirculated to the internal combustion engine 1 are discharged to the outside from the ratio adjustment unit 3.

Figure 21:
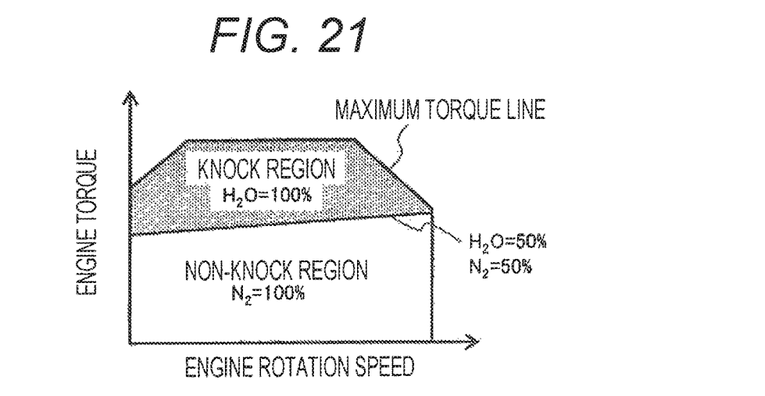
FIG. 21 is an explanatory diagram illustrating an example of setting a ratio between a steam $H_2O$ and a nitrogen $N_2$ with respect to a plane of an engine rotation speed and an engine torque.

FIG. 21 illustrates an example of setting the ratio between the moisture $H_2O$ and the nitrogen $N_2$ of the recirculation gas on the plane of the rotation speed and the engine torque of the internal combustion engine. Here, the ratio of the steam $H_2O$ is set to 100% in the knock region and the ratio of the nitrogen $N_2$ is set to 100% in the non-knock region. Then, in the vicinity of the boundary between the knock region and the non-knock region, the ratio of the steam $H_2O$ is set to 50% and the ratio of the nitrogen $N_2$ is set to 50%.

Thus, when the ratio of the moisture $H_2O$ of the recirculation gas in the knock region is set to be high, the specific heat ratio $\gamma$ of the air-fuel mixture of fuel and air decreases and thus the knocking and the preignition can be suppressed. Further, when the ratio of the nitrogen $N_2$ of the recirculation gas in the non-knock region is set to be high, the specific heat ratio of the air-fuel mixture of fuel and air increases and thus the thermal efficiency can be increased. Accordingly, it is possible to obtain the high thermal efficiency and to suppress the knocking in a wide operation region.

Further, since the moisture $H_2O$ of the steam also has similar properties as the carbon dioxide $CO_2$, both ratios may be set by the parameters illustrated in FIGS. 7 to 19.

Third Embodiment

Further, the specific heat ratio $\gamma$ of the mixture gas of the moisture $H_2O$ of the steam and the carbon dioxide $CO_2$ is smaller than the specific heat ratio $\gamma$ of the nitrogen $N_2$. Thus, since the specific heat ratio $\gamma$ of the air-fuel mixture can be decreased by increasing the ratio of the mixture gas of the carbon dioxide $CO_2$ and the moisture $H_2O$ of the steam of the recirculation gas in the knock region, the knocking or the preignition can be suppressed. From this viewpoint, FIG. 22 illustrates a power train system according to a third embodiment of the invention.

Figure 22:
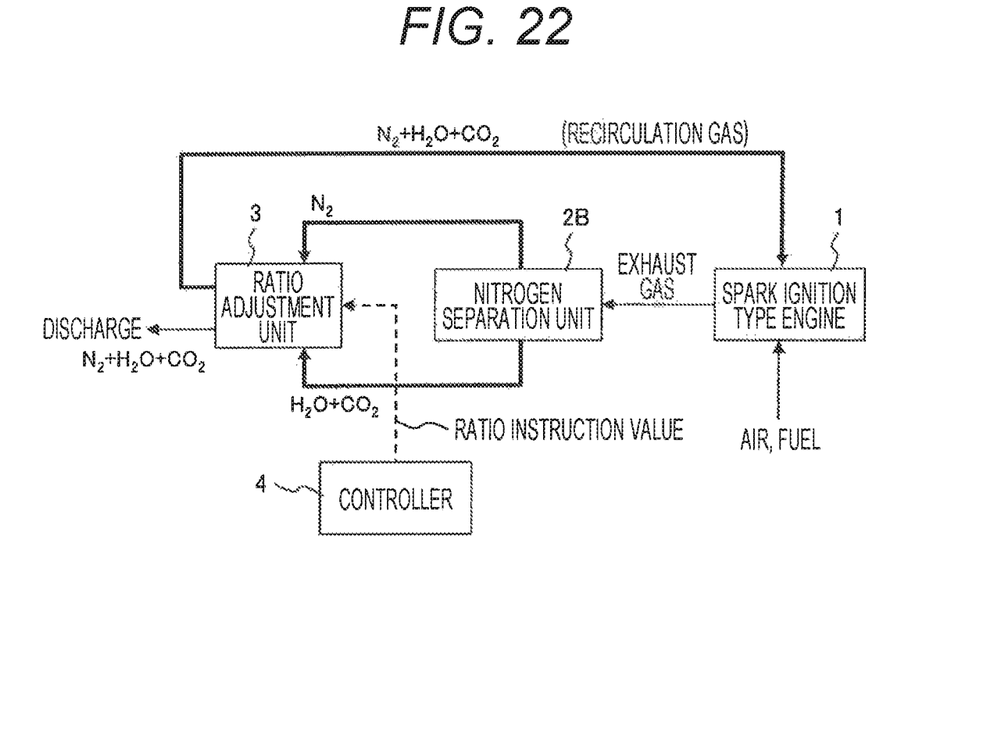
FIG. 22 is a configuration diagram illustrating a configuration of a power train system according to a third embodiment of the invention.

In FIG. 22, Reference Numeral 2B indicates a nitrogen separation unit which separates the nitrogen $N_2$ and the mixture gas of the moisture $H_2O$ of the steam and the carbon dioxide $CO_2$ from the exhaust gas of the internal combustion engine 1. In the embodiment, the nitrogen separation unit 2B is different from that of the first embodiment. Since the other configurations are similar to those of the power train system of the first embodiment, a description thereof will be omitted.

The nitrogen separation unit 2B can be implemented by adsorbing the moisture $H_2O$ and the carbon dioxide $CO_2$ in the exhaust gas by, for example, adsorbent such as zeolite or cerium. Alternatively, the nitrogen separation unit 2B can be implemented by using a nitrogen separation membrane.

Further, the mixture gas of the moisture $H_2O$ of the steam and the carbon dioxide $CO_2$ and the nitrogen $N_2$ separated by the nitrogen separation unit 2B may be an enriched gas including a large amount of the corresponding component compared to the exhaust gas discharged from the internal combustion engine. For example, when the gasoline is burned with a theoretical air-fuel mixture, the separated nitrogen $N_2$ gas may be a nitrogen $N_2$ enriched gas which includes the nitrogen $N_2$ gas of about the volume ratio or 80% or more. Further, the separated mixture gas of the moisture $H_2O$ of the steam and the carbon dioxide $CO_2$ may be an enriched mixture gas of the moisture $H_2O$ of the steam and the carbon dioxide $CO_2$ including the moisture $H_2O$ of the steam and the carbon dioxide $CO_2$ of about the volume ratio of 40% or more in total.

Then, the nitrogen $N_2$ and the mixture gas of the moisture $H_2O$ of the steam and the carbon dioxide $CO_2$ are adjusted to have a predetermined ratio of the nitrogen $N_2$ and the mixture gas of the moisture $H_2O$ of the steam and the carbon dioxide $CO_2$ by the ratio adjustment unit 3 and is recirculated to the internal combustion engine 1 as a recirculation (EGR) gas.

The ratio between the nitrogen $N_2$ and the mixture gas of the moisture $H_2O$ of the steam and the carbon dioxide $CO_2$ of the recirculation gas is arbitrarily set by a ratio instruction value sent from the engine controller 4 to the ratio adjustment unit 3. The extra nitrogen $N_2$ and the mixture gas of the moisture $H_2O$ of the steam and the carbon dioxide $CO_2$ which are left and not recirculated to the internal combustion engine 1 are discharged to the outside from the ratio adjustment unit 3.

Figure 23:
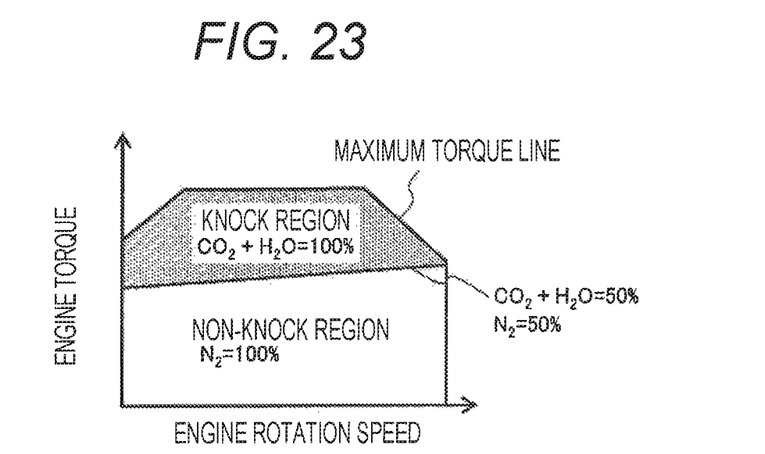
FIG. 23 is an explanatory diagram illustrating an example of setting a ratio between a mixture gas of a carbon dioxide $CO_2$ and a steam $H_2O$ and a nitrogen $N_2$ with respect to a plane of an internal combustion engine rotation speed and an internal combustion engine torque.

FIG. 23 illustrates an example of setting the ratio between the mixture gas of the moisture $H_2O$ of the steam and the carbon dioxide $CO_2$ and the nitrogen $N_2$ of the recirculation gas on the plane of the rotation speed and the engine torque of the internal combustion engine. Here, the ratio of the mixture gas of the carbon dioxide $CO_2$ and the steam $H_2O$ is set to 100% in the knock region and the ratio of the nitrogen $N_2$ is set to 100% in the non-knock region. In the vicinity of the boundary between the knock region and the non-knock region, the ratio of the mixture gas of the carbon dioxide $CO_2$ and the steam $H_2O$ is set to 50% and the ratio of the nitrogen $N_2$ is set to 50%.

Thus, when the specific heat ratio of the mixture gas is decreased by increasing the ratio of the mixture gas of the moisture $H_2O$ of the steam and the carbon dioxide $CO_2$ of the recirculation gas in the knock region, the knocking and the preignition can be suppressed. Further, when the specific heat ratio of the air-fuel mixture is increased by increasing the ratio of the nitrogen $N_2$ of the recirculation gas in the non-knock region, the thermal efficiency can be increased. Accordingly, it is possible to obtain the high thermal efficiency and to suppress the knocking in a wide operation region.

As described above, in the invention, the power train system includes the gas component separation unit which extracts a plurality of gas components having different specific heat ratios from the exhaust gas of the internal combustion engine, the recirculation unit which recirculates the plurality of gas components to the combustion chamber of the internal combustion engine, and the ratio adjustment unit which adjusts the ratio of the plurality of gas components recirculated to the combustion chamber in response to the operation state or the fuel property state.

Thus, it is possible to adjust the composition of the exhaust gas recirculated to the internal combustion engine by various operation conditions. Accordingly, it is possible to improve fuel efficiency, reduce harmful components of the exhaust gas, and improve an output in a wide range of operation conditions of the internal combustion engine.

Further, the invention is not limited to the above-described embodiments and includes various modifications. For example, the above-described embodiments have been described in detail in order to easily describe the invention and do not essentially need to include all configurations. Further, a part of configurations of an embodiment can be replaced by configurations of other embodiments and configurations of other embodiments can be added to configurations of an embodiment. Further, addition, deletion, and replacement of other configurations can be made with respect to a part of configurations of embodiments.

REFERENCE SIGNS LIST 1 spark ignition type internal combustion engine
2 gas component separation unit
4 ratio adjustment unit
4 engine controller
11 steam separation device
12 $CO_2$ separation device
21, 22, 23 distribution valve
24 mixer
31 cylinder
32 piston
33 intake valve
34 exhaust valve
35 cylinder head
36 combustion chamber
37 intake port
38 exhaust port
39 ignition plug
40 fuel injector
41 throttle valve
42 air flow sensor
43 EGR pipe
44 crank angle sensor
45 water temperature sensor

The invention claimed is:

1. A power train system comprising:
a spark ignition type internal combustion engine;
a gas component separation device which extracts a plurality of gas components having different specific heat ratios from an exhaust gas of the internal combustion engine;
a recirculation device which recirculates the plurality of gas components to a combustion chamber of the internal combustion engine; and
a gas components ratio adjustment device which adjusts a ratio of the plurality of gas components recirculated to the combustion chamber in response to an operation state or a fuel property state of the internal combustion engine,
wherein the gas components having different specific heat ratios are a gas component having a relatively large specific heat ratio and a gas component having a relatively small specific heat ratio, and
wherein the gas components ratio adjustment device increases a ratio of the gas component having a relatively large specific heat ratio when an engine torque of the internal combustion engine is lower than a predetermined value and increases a ratio of the gas component having a relatively small specific heat ratio when the engine torque is higher than the predetermined value.

2. The power train system according to claim 1, wherein the gas components ratio adjustment device decreases a ratio of the gas component having a relatively large specific heat ratio and increases a ratio of the gas component having a relatively small specific heat ratio as an engine torque of the internal combustion engine increases.

3. The power train system according to claim 1, wherein the gas components ratio adjustment device decreases a ratio of the gas component having a relatively large specific heat ratio and increases a ratio of the gas component having a relatively small specific heat ratio when a fuel supply amount supplied to the internal combustion engine is large.

4. A power train system comprising:
a spark ignition type internal combustion engine;
a gas component separation device which extracts a plurality of gas components having different specific heat ratios from an exhaust gas of the internal combustion engine;
a recirculation device which recirculates the plurality of gas components to a combustion chamber of the internal combustion engine; and
a gas components ratio adjustment device which adjusts a ratio of the plurality of gas components recirculated to the combustion chamber in response to an operation state or a fuel property state of the internal combustion engine,
wherein the gas components having different specific heat ratios are a gas component having a relatively large specific heat ratio and a gas component having a relatively small specific heat ratio, and
wherein the gas components ratio adjustment device increases a ratio of the gas component having a relatively large specific heat ratio and decreases a ratio of the gas component having a relatively small specific heat ratio in response to one of the following:
(i) a rotation speed of the internal combustion engine increases while an engine torque of the internal combustion engine is large;
(ii) an octane number of fuel supplied to the internal combustion engine increases;
(iii) an alcohol concentration of fuel supplied to the internal combustion engine increases; or
(iv) an intake humidity of intake air taken into the internal combustion engine increases.

5. The power train system according to claim 1, wherein the gas components ratio adjustment device decreases a ratio of the gas component having a relatively large specific heat ratio and increases a ratio of the gas component having a relatively small specific heat ratio as a cooling water temperature, an intake air temperature, a fuel temperature, or an external air temperature of the internal combustion engine increases.

6. The power train system according to claim 1, wherein the gas components ratio adjustment device increases a ratio of the gas component having a relatively large specific heat ratio and decreases a ratio of the gas component having a relatively small specific heat ratio as an octane number of fuel supplied to the internal combustion engine increases.

7. The power train system according to claim 1, wherein the gas components ratio adjustment device increases a ratio of the gas component having a relatively large specific heat ratio and decreases a ratio of the gas component having a relatively small specific heat ratio as an alcohol concentration of fuel supplied to the internal combustion engine increases.

8. The power train system according to claim 1, wherein the gas components ratio adjustment device increases a ratio of the gas component having a relatively large specific heat ratio and decreases a ratio of the gas component having a relatively small specific heat ratio as a natural gas concentration of fuel supplied to the internal combustion engine increases.

9. A power train system comprising:
a spark ignition type internal combustion engine;
a gas component separation device which extracts a plurality of gas components having different specific heat ratios from an exhaust gas of the internal combustion engine;
a recirculation device which recirculates the plurality of gas components to a combustion chamber of the internal combustion engine; and
a gas components ratio adjustment device which adjusts a ratio of the plurality of gas components recirculated to the combustion chamber in response to an operation state or a fuel property state of the internal combustion engine,
wherein the gas components having different specific heat ratios are a gas component having a relatively large specific heat ratio and a gas component having a relatively small specific heat ratio, and
wherein the gas components ratio adjustment device decreases a ratio of the gas component having a relatively large specific heat ratio and increases a ratio of the gas component having a relatively small specific heat ratio as an air-fuel ratio of an air-fuel mixture of fuel and air supplied to the internal combustion engine moves to a lean side when the internal combustion engine is operated in a high load.

10. The power train system according to claim 1, wherein the gas components ratio adjustment device increases a ratio of the gas component having a relatively large specific heat ratio and decreases a ratio of the gas component having a relatively small specific heat ratio as an intake humidity of intake air taken into the internal combustion engine increases.

11. The power train system according to claim 1, wherein the gas component having a relatively small specific heat ratio is carbon dioxide separated from the exhaust gas and the gas component having a relatively large specific heat ratio is nitrogen separated from the exhaust gas.

12. The power train system according to claim 4, wherein the gas component having a relatively small specific heat ratio is carbon dioxide separated from the exhaust gas and the gas component having a relatively large specific heat ratio is nitrogen separated from the exhaust gas.

13. The power train system according to claim 9, wherein the gas component having a relatively small specific heat ratio is carbon dioxide separated from the exhaust gas and the gas component having a relatively large specific heat ratio is nitrogen separated from the exhaust gas.

* * * * *